United States Patent
Saida et al.

(10) Patent No.: US 9,235,003 B2
(45) Date of Patent: Jan. 12, 2016

(54) WAVEGUIDE-TYPE POLARIZATION BEAM SPLITTER

(75) Inventors: Takashi Saida, Atsugi (JP); Yusuke Nasu, Atsugi (JP); Takayuki Mizuno, Atsugi (JP); Ryoichi Kasahara, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 13/981,285

(22) PCT Filed: Jan. 25, 2012

(86) PCT No.: PCT/JP2012/000474
§ 371 (c)(1),
(2), (4) Date: Jul. 23, 2013

(87) PCT Pub. No.: WO2012/102039
PCT Pub. Date: Aug. 2, 2012

(65) Prior Publication Data
US 2013/0301976 A1 Nov. 14, 2013

(30) Foreign Application Priority Data

Jan. 26, 2011 (JP) ................................ 2011-014545

(51) Int. Cl.
| | |
|---|---|
| *G02B 6/12* | (2006.01) |
| *G02B 6/126* | (2006.01) |
| *G02B 6/27* | (2006.01) |
| *G02B 6/28* | (2006.01) |

(52) U.S. Cl.
CPC .............. *G02B 6/126* (2013.01); *G02B 6/2793* (2013.01); *G02B 6/2813* (2013.01); *G02B 2006/1215* (2013.01); *G02B 2006/12116* (2013.01)

(58) Field of Classification Search
CPC .... G02B 6/2766; G02B 6/272; G02B 6/2773; G02B 6/2713; G02B 6/283; G02B 6/105; G02B 6/126
USPC ................................................ 385/11, 31, 35
See application file for complete search history.

(56) References Cited

U.S. PATENT DOCUMENTS

| | | |
|---|---|---|
| 5,694,496 A | 12/1997 | Ando et al. |
| 6,115,514 A | 9/2000 | Ando et al. |

(Continued)

FOREIGN PATENT DOCUMENTS

| | | |
|---|---|---|
| CN | 101573645 | 11/2009 |
| CN | 101784926 | 7/2010 |

(Continued)

OTHER PUBLICATIONS

International Search Report, dated Mar. 21, 2012, from related PCT Application No. PCT/JP2012/000474.

(Continued)

*Primary Examiner* — Eric Wong
*Assistant Examiner* — Mary A El Shammaa
(74) *Attorney, Agent, or Firm* — Workman Nydegger

(57) ABSTRACT

Provided is a waveguide-type polarization beam splitter in which deterioration of a polarization extinction ratio due to temperature change and wavelength change is suppressed. A groove is formed to extend across a pair of optical waveguide arms and two quarter wave plates are provided in the groove to extend respectively across the arms. Polarization axes of the quarter wave plates are orthogonal to each other. A first optical coupler which gives a phase difference of 0° or 180° between coupled or split light beams and a second optical coupler which gives a phase difference of 90° or −90° between coupled or split light beams are used in combination.

10 Claims, 12 Drawing Sheets

(56) References Cited

U.S. PATENT DOCUMENTS

| | | |
|---|---|---|
| 8,346,030 B2 | 1/2013 | Hashizume et al. |
| 2001/0022878 A1 | 9/2001 | Saida et al. |
| 2010/0104237 A1 | 4/2010 | Nasu et al. |
| 2012/0063716 A1 | 3/2012 | Mizuno et al. |
| 2012/0207474 A1* | 8/2012 | Inoue et al. .................... 398/65 |

FOREIGN PATENT DOCUMENTS

| | | |
|---|---|---|
| EP | 0 623 830 | 11/1994 |
| EP | 1302793 | 4/2003 |
| JP | 4-241304 | 8/1992 |
| JP | 07-092326 | 4/1995 |
| JP | 11-30766 | 2/1999 |
| JP | 2001-50860 | 2/2001 |
| JP | 2001-255567 | 9/2001 |
| JP | 2007-286426 | 11/2007 |
| WO | 2008/084707 A1 | 7/2008 |
| WO | 2010/140363 A1 | 9/2010 |
| WO | 2010160363 | 12/2010 |

OTHER PUBLICATIONS

International Preliminary Report on Patentability and Written Opinion dated Aug. 8, 2013 for related PCT Application No. PCT/JP2012/000474.

Extended European Search Report dated Jan. 22, 2014 in corresponding European Patent Application No. 12739739.6.

Nasu et al.; "Polarization insensitive Mach-Zehnder interferometer by orthogonal half-waveplate alignment;" NTT photonics Labs and NTT Network Innovation Labs, NTT Corp.; Institute of Electronics, Information, and Communication Engineers; Sep. 10-14, 2007, p. 129.

Notice of Allowance in corresponding Japanese Patent Application No. 2012-554690; Dated Jun. 17, 2014.

Office Action dated Feb. 15, 2015 in corresponding Chinese Patent Application No. 201280006559.4.

U.S. Appl. No. 13/981,304, Apr. 24, 2015, Non Final Office Action.

International Search Report dated Feb. 23, 2012 from corresponding PCT Application No. PCT/JP2012/000476.

International Preliminary Report on Patentability and Written Opinion dated Aug. 8, 2013 from corresponding PCT Application No. PCT/JP2012/000476.

Office Action in corresponding Chinese Patent Application No. 201280006557.5 dated Mar. 23, 2015.

Office Action issued on Aug. 17, 2015 in corresponding Chinese Application No. 201280006557.5.

* cited by examiner

WAVEGUIDE-TYPE POLARIZATION BEAM SPLITTER

TECHNICAL FIELD

The present invention relates to a waveguide-type polarization beam splitter, and more specifically, to a waveguide-type polarization beam splitter which couples and splits polarized waves.

BACKGROUND ART

Polarized and multiplexed optical signals are increasingly used for large-capacity optical communications and importance of polarization beam splitters for coupling and splitting polarized waves is increasing. Particularly, a waveguide-type polarization beam splitter is attracting attention because the waveguide-type polarization beam splitter can be integrated with other waveguide-type devices such as a coupler, a delayed interferometer, and an optical hybrid. The waveguide-type polarization beam splitter generally achieves a polarization wave coupling-splitting function as follows. A phase difference of π is provided between a TE polarization and a TM polarization in a configuration of a Mach-Zehnder interferometer (MZI) and the phase difference of the TE polarization in the interferometer is set to 0 (or π) while the phase difference of the TM polarization in the interferometer is set to π (or 0).

FIG. 1 shows an example of a conventional waveguide-type polarization beam splitter. The conventional waveguide-type polarization beam splitter includes input optical waveguides 101a, 101b, a first optical coupler 102, a pair of waveguide arms 103, a groove 104 provided to extend across the waveguide arms 103, quarter wave plates 105a, 105b of angles of 0° and 90° which are inserted in the groove 104, a second optical coupler 106, and output optical waveguides 107a, 107b (see Patent Literature 1). Since the wave plates inserted in the respective arms give the phase difference between the polarized waves in this method, a polarization beam splitter excellent in temperature characteristics can be achieved.

CITATION LIST

Patent Literature

PTL 1: Japanese Patent Laid-Open No. H07-092326 (1995)

SUMMARY OF INVENTION

Technical Problem

However, the conventional configuration has a problem that wavelength dependence is large. In the configuration of FIG. 1, since directional couplers are used for the first optical coupler 102 and the second optical coupler 106, the wavelength dependence of the directional couplers occurs. Moreover, since the quarter wave plates 105 give phases of 90° and −90° to the polarization TE and the polarization TM orthogonal thereto, a delay portion of a quarter wavelength needs to be provided in the waveguide arm 103a or 103b for the operation of the polarization beam splitter. Since the delay portion has the wavelength dependency, the characteristics of the polarization beam splitter deteriorate.

FIG. 2 is a view showing the wavelength characteristics of the conventional waveguide-type polarization beam splitter which is ideally manufactured. As is apparent from FIG. 2, even in the ideally-manufactured conventional waveguide-type polarization beam splitter, an extinction ratio deteriorates to a level equal to or below 25 dB in a wavelength range of 1.53 to 1.565 microns.

FIG. 3 shows a histogram of the conventional waveguide-type polarization beam splitter in a case where the manufacturing tolerance is considered. Even in a case where the manufacturing tolerance is considered, the extinction ratio of a port 1 is equal to or below 25 dB.

The present invention has been made in view of the above problems and an object thereof is to provide a waveguide-type polarization beam splitter in which deterioration of a polarization extinction ratio due to temperature change and wavelength change is suppressed.

Solution to Problem

To achieve such an object, a first aspect of the present invention provides a waveguide-type polarization beam splitter which is formed on a substrate and which includes: one or two input optical waveguides; a first optical coupler optically coupled to the one or two input optical waveguides and having one input and two outputs or two inputs and two outputs; a pair of optical waveguide arms optically coupled to the outputs of the first optical coupler; and a second optical coupler optically coupled to the pair of optical waveguide arms and having two inputs and one output or two inputs and two outputs. The waveguide-type polarization beam splitter is characterized in that a groove is provided to extend across both of the pair of optical waveguide arms, two quarter wave plates are inserted in the groove to extend respectively across the pair of optical waveguide arms, and polarization axes of the respective two quarter wave plates are orthogonal to each other. Moreover, one of the first optical coupler and the second optical coupler is an optical coupler which gives a phase shift of about 90° or about −90° between coupled or split light beams, and another one of the first optical coupler and the second optical coupler is an optical coupler which gives a phase shift of about 0° or about 180° between coupled or split light beams.

A second aspect of the present invention is the first aspect characterized in that the optical coupler which gives the phase shift of about 0° or about 180° between coupled or split light beams is any one of a Y-branch coupler, a multimode interference optical coupler having one input and two outputs, a multimode interference optical coupler having two inputs and one output, and an X-branch coupler.

A third aspect of the present invention is the first or second aspect characterized in that the optical coupler which gives the phase shift of about 90° or about −90° between coupled or split light beams is a multimode interference optical coupler having two inputs and two outputs or a directional coupler.

A fourth aspect of the present invention is any one of the first to third aspects characterized in that the angles of the polarization axes of the two quarter wave plates respectively form angles of 0° and 90° with respect to a substrate plane of a waveguide.

A fifth aspect of the present invention is any one of the first to fourth aspects characterized in that each of the two quarter wave plates is a polyimide wave plate.

A sixth aspect of the present invention is any one of the first to fifth aspects characterized in that the waveguide-type polarization beam splitter further comprises tapered portions before and after the groove.

A seventh aspect of the present invention is any one of the first to sixth aspects characterized in that the waveguide-type polarization beam splitter further comprises waveguide lenses before and after the groove.

An eighth aspect of the present invention is any one of the first to seventh aspects characterized in that each of the optical waveguides is a quartz-based optical waveguide formed on a silicon substrate.

Advantageous Effects of Invention

The groove is provided to extend across both of the pair of optical waveguide arms forming a MZI, the two quarter wave plates are inserted in the groove to extend respectively across the pair of optical waveguide arms, quarter wave plates whose polarization axes are orthogonal to each other are used as the two quarter wave plates, and the optical coupler which gives the phase shift of about 90° or about −90° and the optical coupler which gives the phase shift of about 0° or about 180° are used in combination as the optical couplers. This can provide a waveguide-type polarization beam splitter in which deterioration of the polarization extinction ratio due to wavelength change and temperature change is suppressed.

DESCRIPTION OF EMBODIMENTS

Embodiments of the present invention are described below with reference to the drawings.

(First Embodiment)

Figure 4:
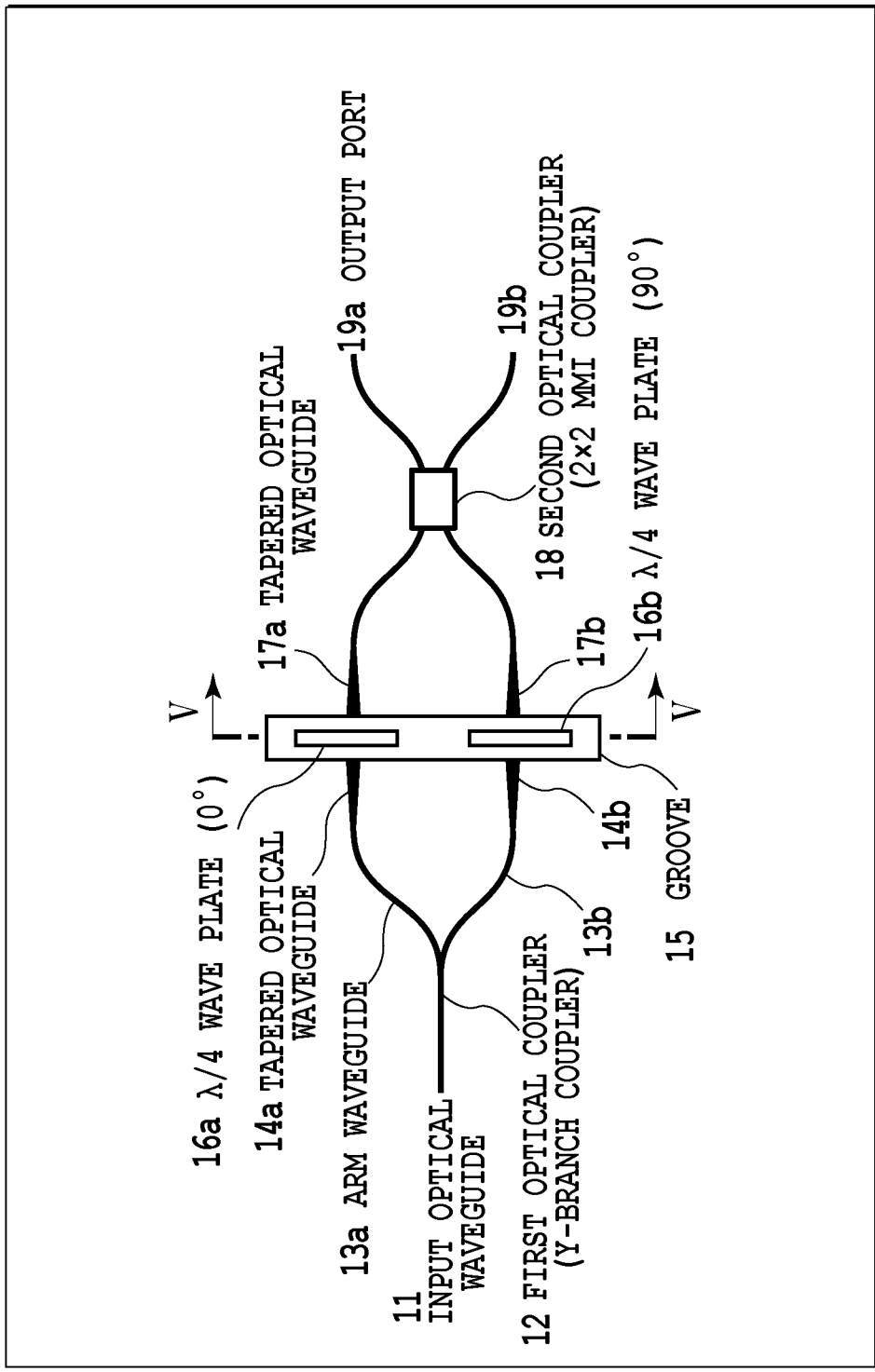
FIG. 4 is a view showing a waveguide-type polarization beam splitter of a first embodiment.

FIG. 4 shows a waveguide-type polarization beam splitter of a first embodiment. The waveguide-type polarization beam splitter includes: one input optical waveguide 11; a first optical coupler 12 which is optically coupled to the one input optical waveguide 11 and which has one input and two outputs; a pair of optical waveguide arms 13a and 13b which is optically coupled to the respective outputs of the first optical coupler; and a second optical coupler 18 which is optically coupled to the pair of optical waveguide arms 13a and 13b and which has two inputs and two outputs. The first optical coupler 12, the pair of optical waveguide arms 13, and the second optical coupler 18 form a MZI.

In the waveguide-type polarization beam splitter of the embodiment, a groove 15 is formed to extend across the pair of optical waveguide arms 13a, 13b and two quarter wave plates 16a, 16b are provided in the groove 15 to extend across the arms 13a, 13b, respectively. Quarter wave plates whose polarization axes are orthogonal to each other are used as the two quarter wave plates 16a, 16b. In such a configuration, the two arms 13a, 13b, including the inserted wave plates, are completely symmetric to each other except in the directions of the polarization axes. Accordingly, temperature dependence is small.

Moreover, a Y-branch coupler which gives a phase difference of 0° between light beams to be outputted to the optical waveguide arms 13a and 13b is used as the first optical coupler 12. Furthermore, a multimode interference (MMI) coupler which gives, respectively to light beams to be outputted to output ports 19a and 19b, phase differences of about 90° and about −90° with respect to light inputs respectively from the waveguide arms 13a and 13b and which has two inputs and two outputs (2×2) is used as the second optical coupler 18. Using the optical coupler which gives the phase difference of 0° or 180° between the coupled and split light beams and the optical coupler which gives the phase difference of 90° or −90° between the coupled and split light beams in combination can make the respective lengths of the waveguide arms 13a and 13b coincide with each other. Accordingly, there is no need to use a delay portion having wavelength dependence and the wavelength dependence is thus reduced.

In the embodiment, the Y-branch coupler is used as the optical coupler which gives the phase difference of about 0° or about 180° between the coupled and split light beams. This is because a small and low-loss waveguide-type polarization beam splitter can be provided by using the Y-branch coupler. However, the present invention is not limited to this example. Any optical coupler, such as an MMI coupler having one input and two outputs (1×2) or an adiabatic X-branch coupler, which gives the phase difference of 0° or 180° between the coupled and split light beams can be used as a matter of course.

In the embodiment, a 2×2 MMI coupler is used as an optical coupler which gives the phase difference of about 90° or about −90° between the coupled and split light beams. This is because a polarization beam splitter having small wavelength dependence and excellent manufacturing tolerance can be provided by using the 2×2 MMI coupler. However, the present invention is not limited to this example. Any coupler, such as a directional coupler, which gives the phase difference of about 90° or about −90° between the coupled and split light beams can be used as a matter of course.

In the embodiment, the waveguide beam splitter having one input and two outputs is formed by using the Y-branch coupler having one input and two outputs on the input side and by using the MMI coupler having two inputs and two outputs on the output side. However, it is possible to reverse the input and the output and configure a polarization beam combiner having two inputs and one output by using the MMI optical coupler having two inputs and two outputs on the input side and by using the Y-branch coupler having two inputs and one output on the output side, as a matter of course.

Each of the arms 13a, 13b included in the pair of optical waveguide arms 13 can be, for example, a silica-based optical waveguide having a relative index difference of 1.5% on a silicon substrate. This optical waveguide has such advantages that a connection loss with an optical fiber is less than 0.6 dB/point and the mass productivity and controllability are excellent.

The quarter wave plates 16a, 16b can be manufactured from polyimide. Since the quarter wave plates 16a, 16b made of polyimide are thin, the groove 15 in which the quarter wave plates 16a, 16b are inserted can have such a narrow width as 20 μm, for example. Setting the angles of the polarization axes to 0° and 90° with respect to the line perpendicular to a plane on which the pair of optical waveguide arms 13a and 13b are formed causes the separated polarization waves to become linear polarization waves and handling is facilitated.

A tapered portion may be provided in each of waveguide portions before and after the groove 15 to reduce an excess loss in the groove 15. The width of a terminal end of the tapered portion is preferably 10 μm or more.

Figure 5:
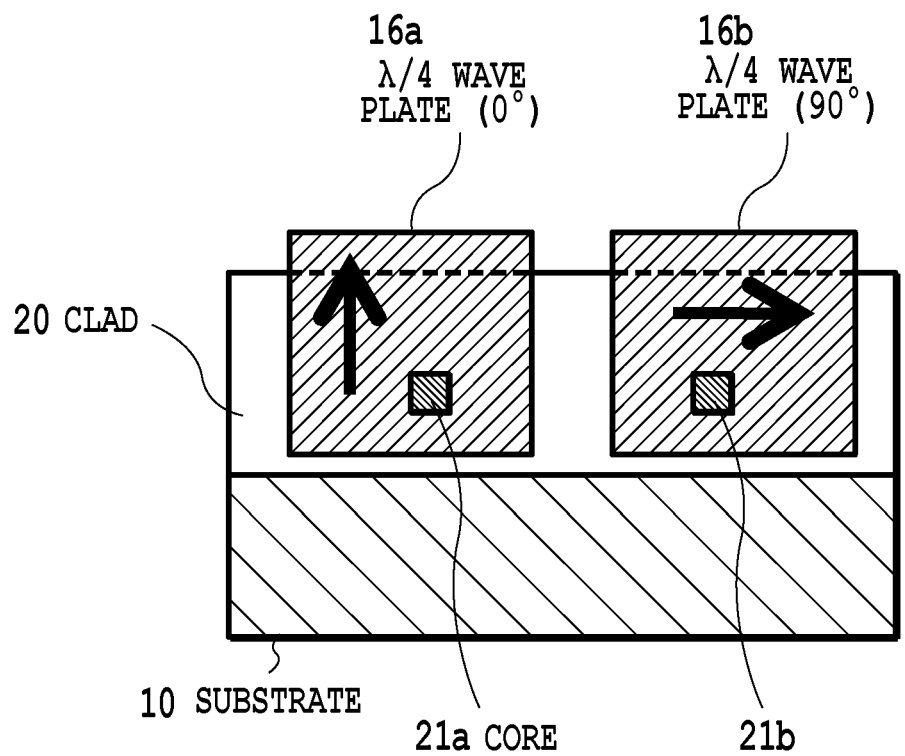
FIG. 5 is a cross-sectional view taken along the V-V line of FIG. 4.

FIG. 5 shows a cross-sectional view taken along the V-V line of FIG. 4. The two arms 13a, 13b are formed on a substrate 10 and the quarter wave plates 16a, 16b are provided to extend across cores of the respective arms 13a, 13b.

Figure 1:
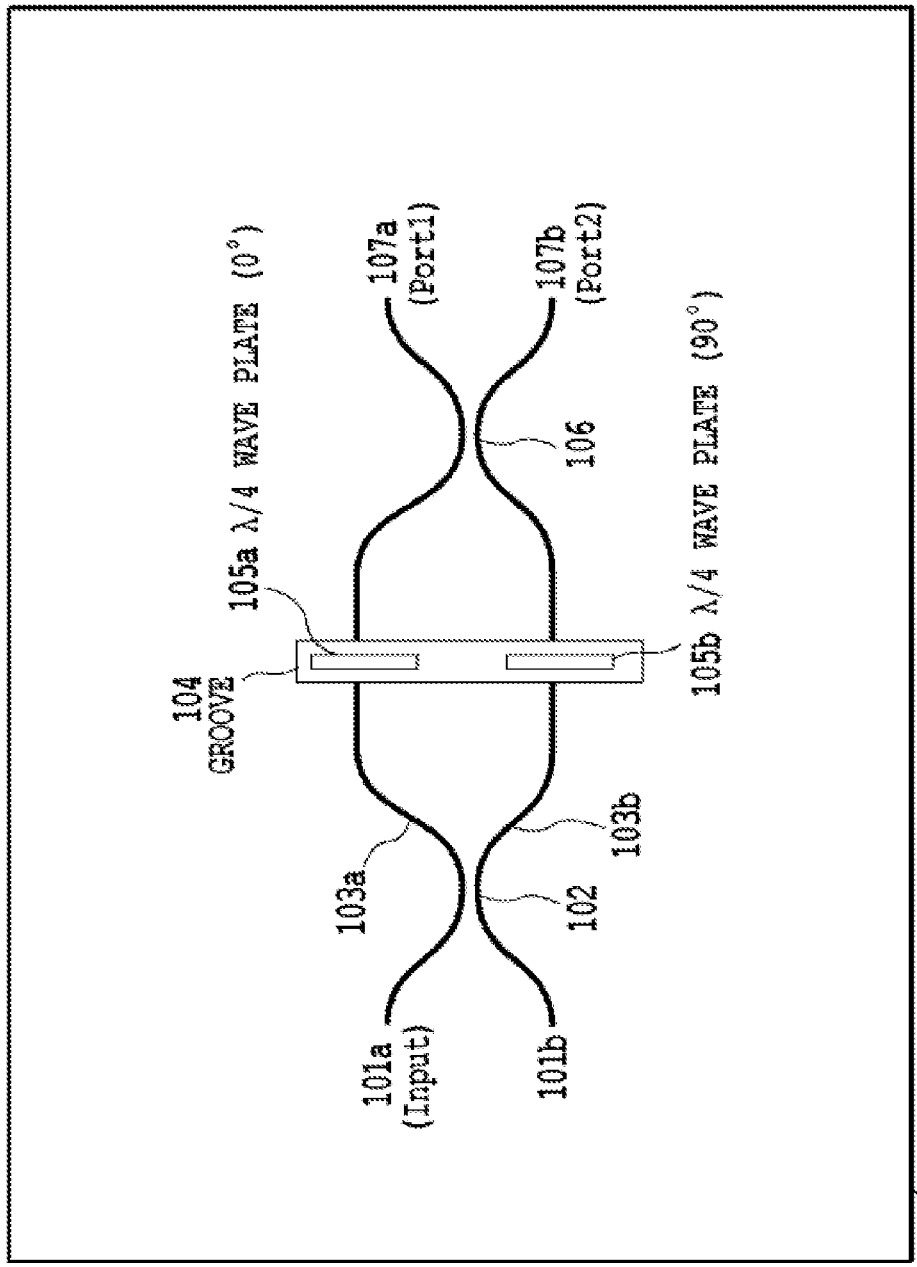
FIG. 1 is a view showing a conventional waveguide-type polarization beam splitter.
Figure 2:
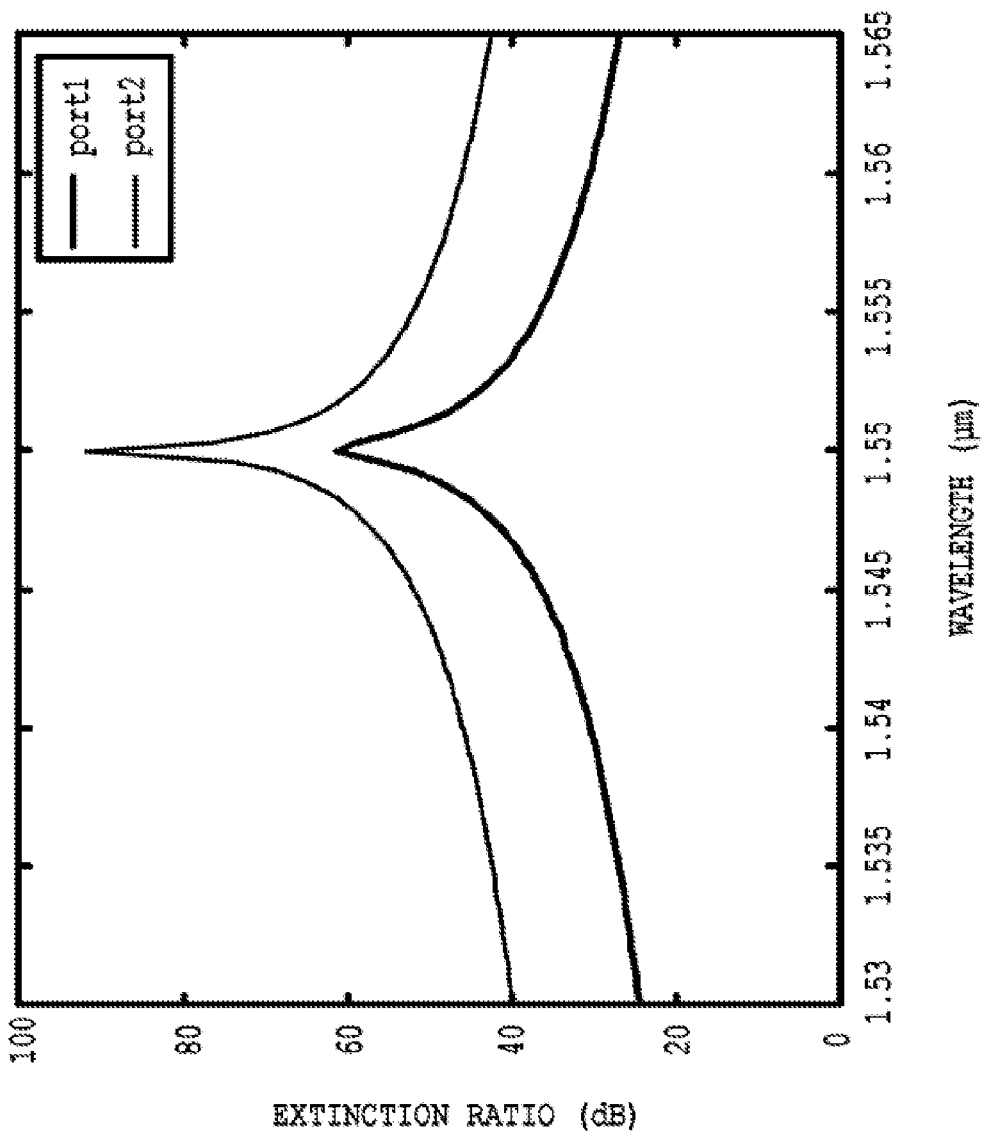
FIG. 2 is a graph showing wavelength dependence of a polarization extinction ratio of the conventional waveguide-type polarization beam splitter.
Figure 6:
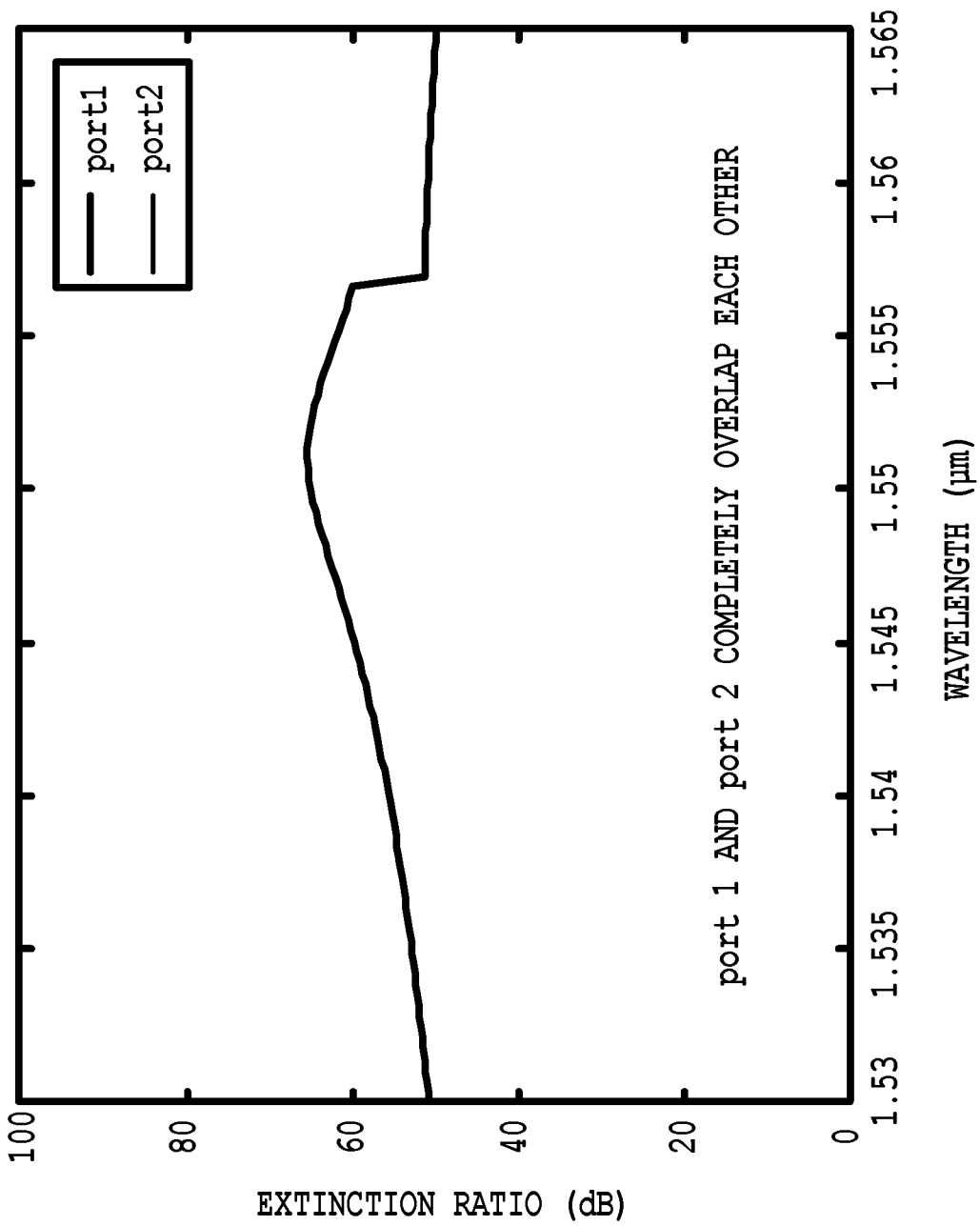
FIG. 6 is a graph showing wavelength dependence of a polarization extinction ratio of a waveguide-type polarization beam splitter in the first embodiment.

In contrast to the example shown in FIG. 2, in the waveguide-type polarization beam splitter of the embodiment, the wavelength dependence of the polarization extinction ratio is drastically reduced as shown in FIG. 6.

Figure 3:
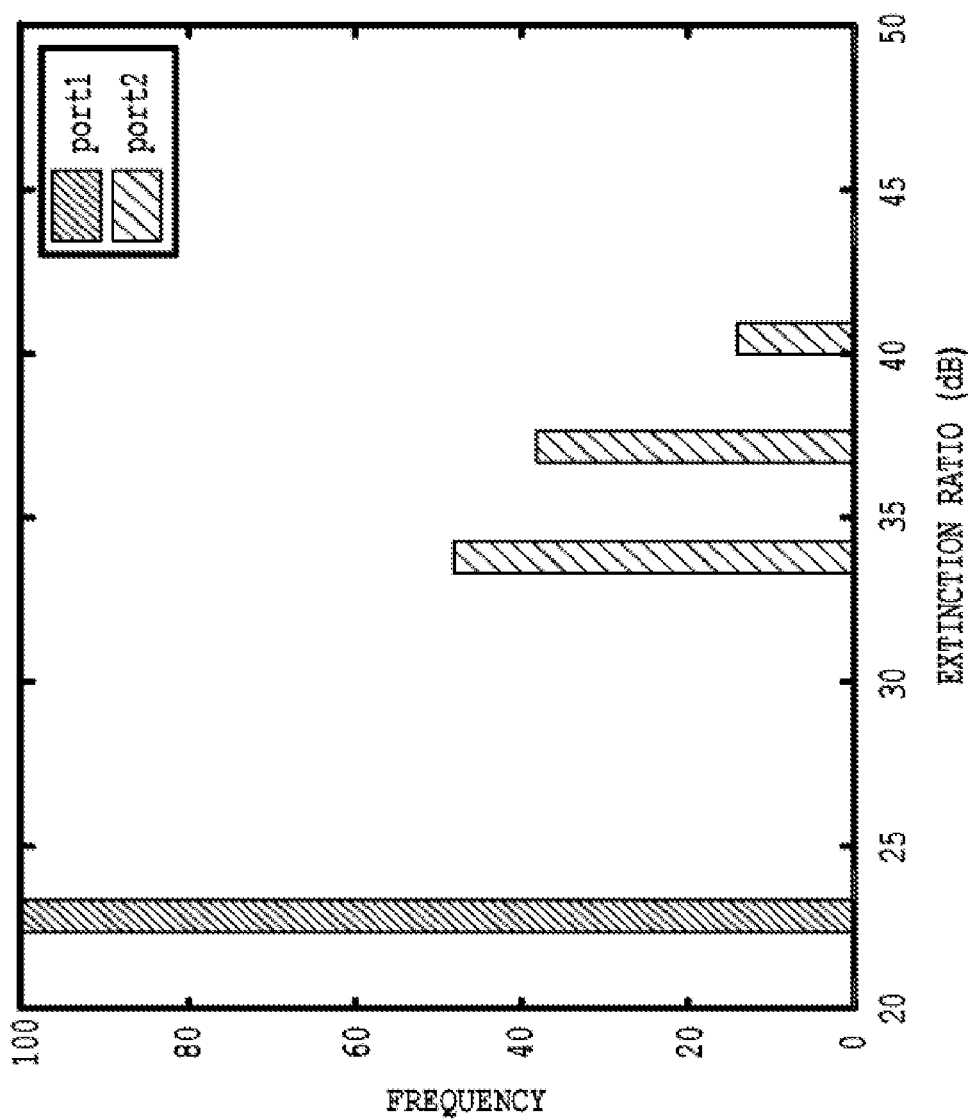
FIG. 3 is a histogram showing the polarization extinction ratio of the conventional waveguide-type polarization beam splitter.
Figure 7:
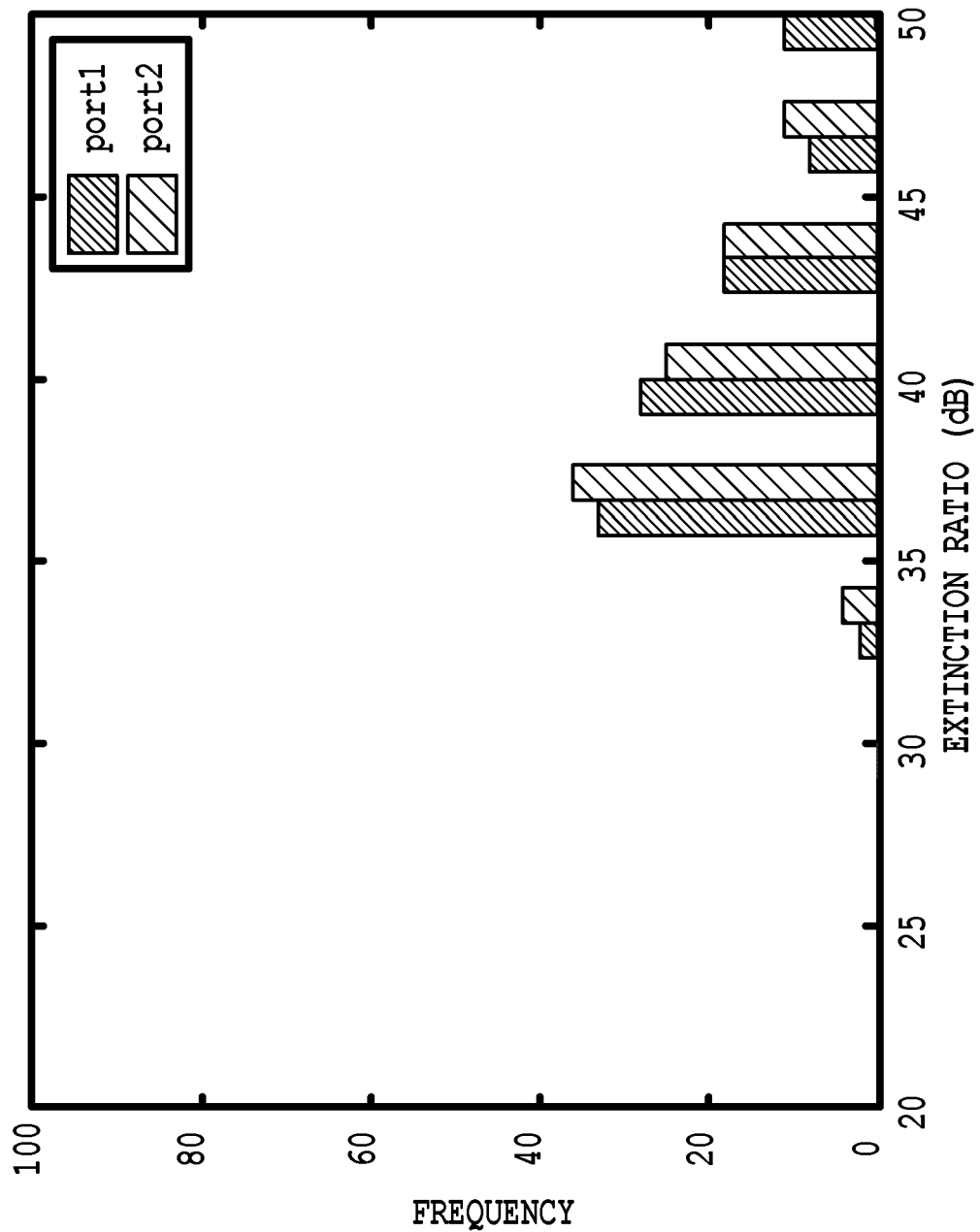
FIG. 7 is a histogram showing the polarization extinction ratio of the waveguide-type polarization beam splitter in the first embodiment.

Moreover, in contrast to the example shown in FIG. 3, in the waveguide-type polarization beam splitter of the embodiment, the polarization extinction ratio of 30 dB or more is secured as shown in FIG. 7 in a case where the manufacturing tolerance is considered.

(Modification of the First Embodiment)

Figure 8:
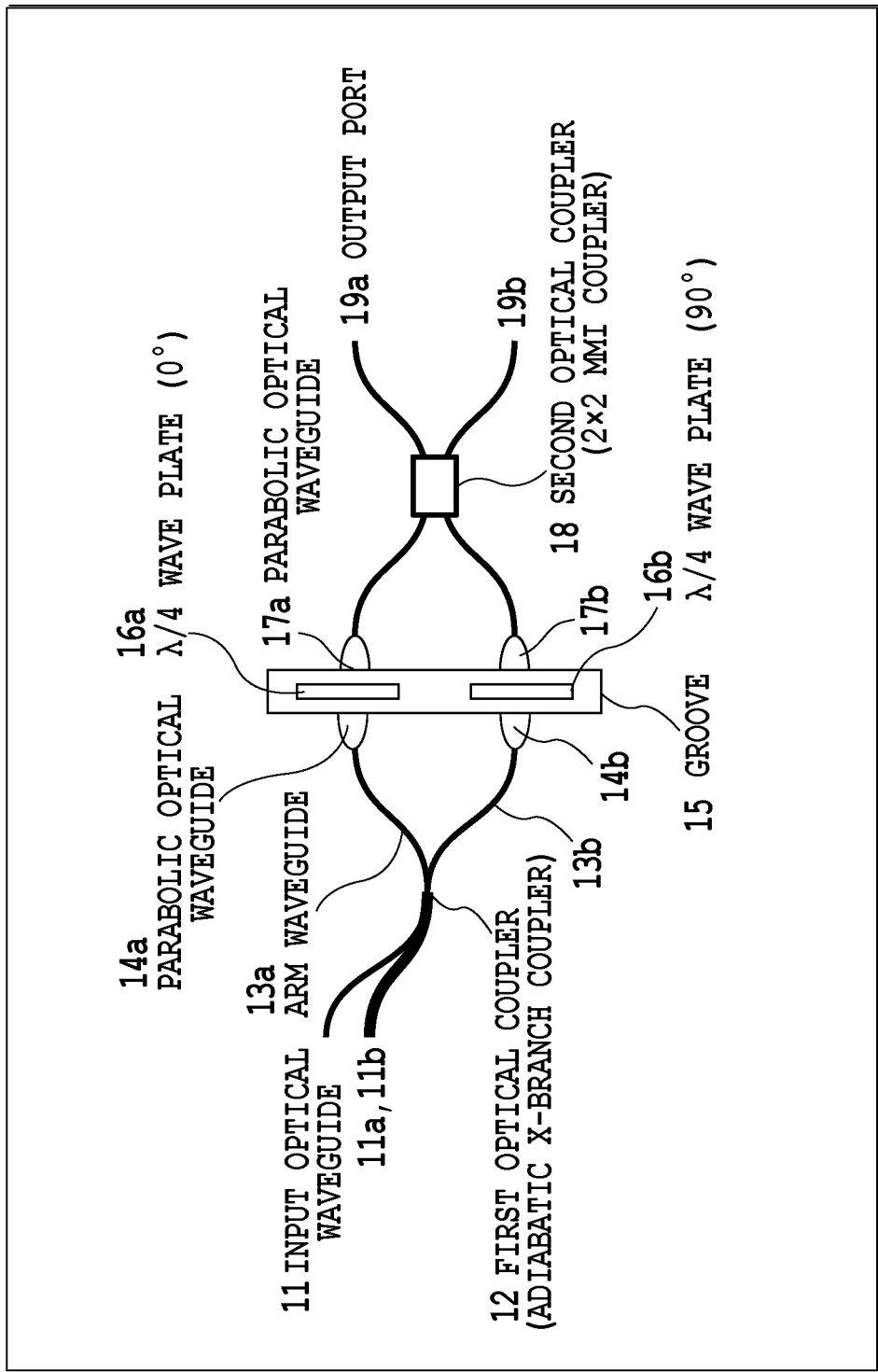
FIG. 8 is a view showing a modification of the waveguide-type polarization beam splitter of the first embodiment.

FIG. 8 shows a waveguide-type polarization beam splitter of a modification of the first embodiment. The waveguide-type polarization beam splitter includes: two input optical waveguides 11a, 11b; a first optical coupler 12 which is optically coupled to the two input optical waveguides 11a, 11b and which has two inputs and two outputs; a pair of optical waveguide arms 13 which is optically coupled to the respective outputs of the first optical coupler; and a second optical coupler 18 which is optically coupled to the pair of optical waveguide arms 13 and which has two inputs and two outputs. The first optical coupler 12, the pair of optical waveguide arms 13, and the second optical coupler 18 form a MZI.

In the waveguide-type polarization beam splitter of the embodiment, a groove 15 is formed to extend across both of the paired optical waveguide arms 13a, 13b and two quarter wave plates 16a, 16b are provided in the groove 15 to extend across the arms 13a, 13b, respectively. Quarter wave plates whose polarization axes are orthogonal to each other are used as the two quarter wave plates 16a, 16b. In such a configuration, the two arms 13a, 13b, including the inserted wave plates, are completely symmetric to each other except in the directions of the polarization axes. Accordingly, the temperature dependence is reduced.

Moreover, an adiabatic X-branch coupler which gives a phase difference of about 0° and about 180° between light beams to be outputted to the optical waveguide arms 13a and 13b is used as the first optical coupler 12. Furthermore, a multimode interference (MMI) coupler which gives, respectively to light beams to be outputted to output ports 19a and 19b, phase differences of about 90° and about −90° with respect to light inputs respectively from the waveguide arms 13a and 13b and which has two inputs and two outputs (2×2) is used as the second optical coupler 18. Using the optical coupler which gives the phase difference of about 0° or about 180° between the coupled and split light beams and the optical coupler which gives the phase difference of about 90° or about −90° between the coupled and split light beams in combination can make the respective lengths of the waveguide arms 13a and 13b coincide with each other. Accordingly, there is no need to use a delay portion having wavelength dependence and the wavelength dependence is thus reduced.

A parabolic optical waveguide may be provided in each of waveguide portions before and after the groove 15 to reduce an excess loss in the groove 15. The width of a terminal end of the parabolic optical waveguide is preferably 10 μm or more.

Even in such a configuration, the waveguide-type polarization beam splitter having small wavelength dependence and small temperature dependence can be provided.

(Second Embodiment)

Figure 9:
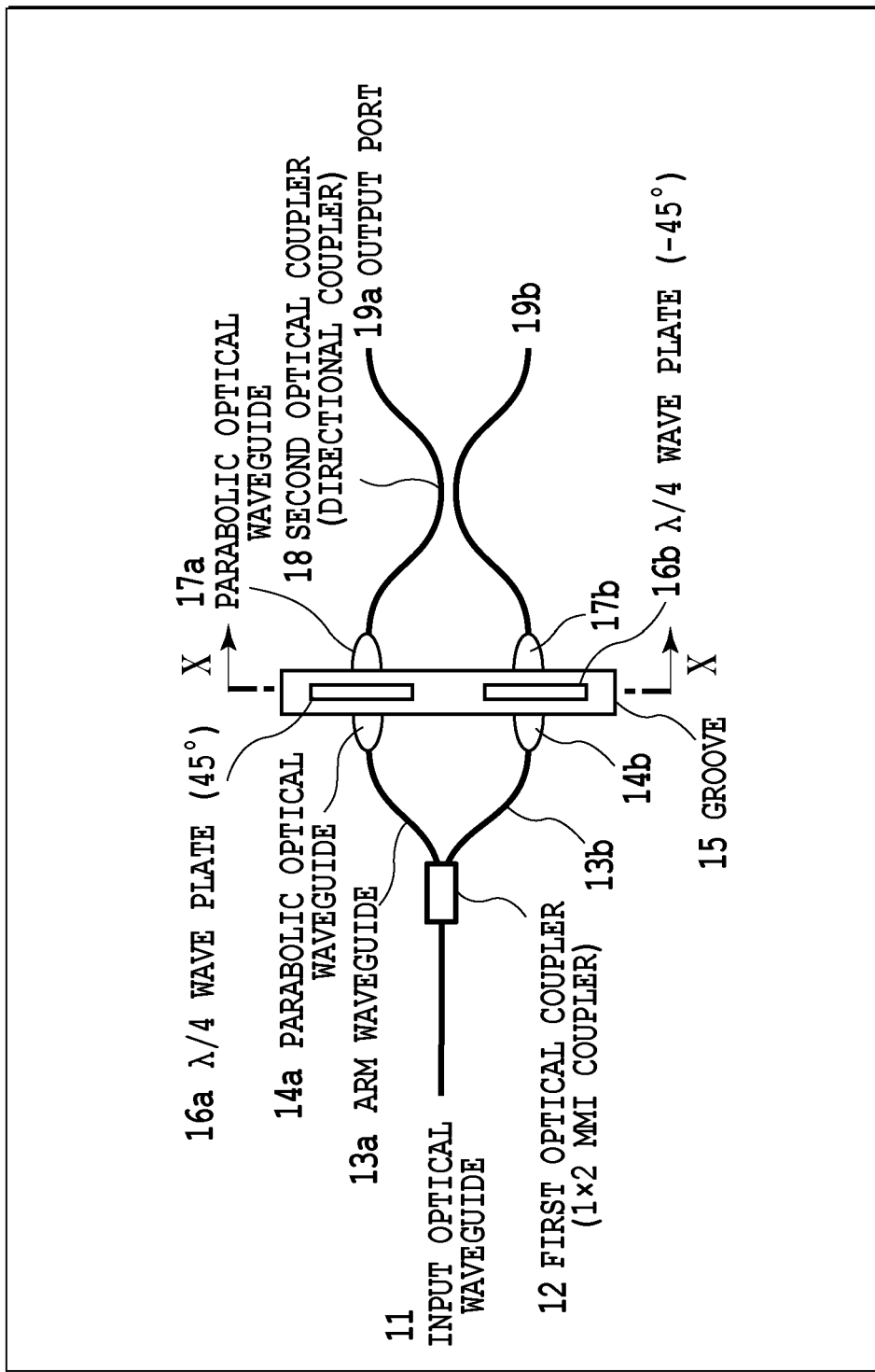
FIG. 9 is a view showing a waveguide-type polarization beam splitter of a second embodiment.

FIG. 9 shows a waveguide-type polarization beam splitter of a second embodiment. The waveguide-type polarization beam splitter includes: one input optical waveguide 11; a first optical coupler 12 which is optically coupled to the one input optical waveguide 11 and which has one input and two outputs; a pair of optical waveguide arms 13 (13a and 13b) which are optically coupled to the respective outputs of the first optical coupler; and a second optical coupler 18 which is optically coupled to the pair of optical waveguide arms 13a and 13b and which has two inputs and two outputs. The first optical coupler 12, the pair of optical waveguide arms 13, and the second optical coupler 18 form a MZI.

In the waveguide-type polarization beam splitter of the embodiment, a groove 15 is formed to extend across the pair of optical waveguide arms 13a, 13b and two quarter wave plates 16a, 16b are provided in the groove 15 to extend across the arms 13a, 13b, respectively. Quarter wave plates whose polarization axes are orthogonal to each other are used as the two quarter wave plates 16a, 16b. In such a configuration, the two arms 13a, 13b, including the inserted wave plates, are completely symmetric to each other except in the directions of the polarization axes. Accordingly, the temperature dependence is reduced.

Moreover, a MMI coupler which gives a phase difference of 0° between light beams to be outputted to the optical waveguide arms 13a and 13b and which has one input and two outputs (1×2) is used as the first optical coupler 12. Furthermore, a directional coupler which gives, respectively to light beams to be outputted to output ports 19a and 19b, phase differences of about 90° and about −90° with respect to light inputs respectively from the waveguide arms 13a and 13b and which has two inputs and two outputs is used as the second optical coupler 18. Using the optical coupler which gives the phase difference of about 0° or about 180° between the coupled and split light beams and the optical coupler which gives the phase difference of about 90° or about −90° between the coupled and split light beams in combination can make the respective lengths of the waveguide arms 13a and 13b coincide with each other. Accordingly, there is no need to use a delay portion having wavelength dependence and the wavelength dependence is thus reduced.

In the embodiment, the MMI optical coupler of 1×2 is used as the optical coupler which gives the phase difference of 0° between the coupled and split light beams. However, the invention is not limited to this example. Any optical coupler, such as an adiabatic X-branch optical coupler or a lattice optical circuit including Mach-Zehnder interferometers connected in cascade, which gives the phase difference of 0° or 180° between the coupled and split light beams can be used, as a matter of course.

In the embodiment, the directional coupler is used as the optical coupler which gives the phase difference of about 90° or about −90° between the coupled and split light beams. This is because a polarization beam splitter having a small loss can be provided by using the directional coupler. However, the present invention is not limited to this example. Any coupler, such as a MMI coupler, which gives the phase difference of about 90° or about −90° between coupled and split light beams can be used as a matter of course.

In the embodiment, the polarization beam splitter having two inputs and two outputs is formed by using the MMI optical coupler having one input and two outputs on the input side and by using the directional coupler having two inputs and two outputs on the output side. However, it is possible to reverse the input and the output and configure a polarization beam combiner having two inputs and one output by using the directional coupler having two inputs and two outputs on the input side and by using the MMI optical coupler having two inputs and one output on the output side, as a matter of course.

Each of the arms 13a, 13b included in the pair of optical waveguide arms 13 can be, for example, a silica-based optical waveguide having a relative index difference of 1.5% on a silicon substrate. This optical waveguide has such advantages that a connection loss with an optical fiber is less than 0.6 dB/point and the mass productivity and controllability are excellent.

The quarter wave plates 16a, 16b can be manufactured from crystalline quartz. The crystalline quartz has such characteristics that a wave plate having high stiffness and free of problems such as bending and warping can be provided and controllability is improved. Setting the angles of the polarization axes to 45° and −45° with respect to a line perpendicular to a plane on which the pair of optical waveguide arms 13a and 13b are formed allows the same type of wave plates to be inserted in different directions. Accordingly, there is an advantage that the number of parts can be reduced.

A parabolic optical waveguide 17 may be provided in each of waveguide portions before and after the groove 15 to reduce an excess loss in the groove 15. The width of a terminal end of the parabolic optical waveguide is preferably 10 μm or more.

Figure 10:
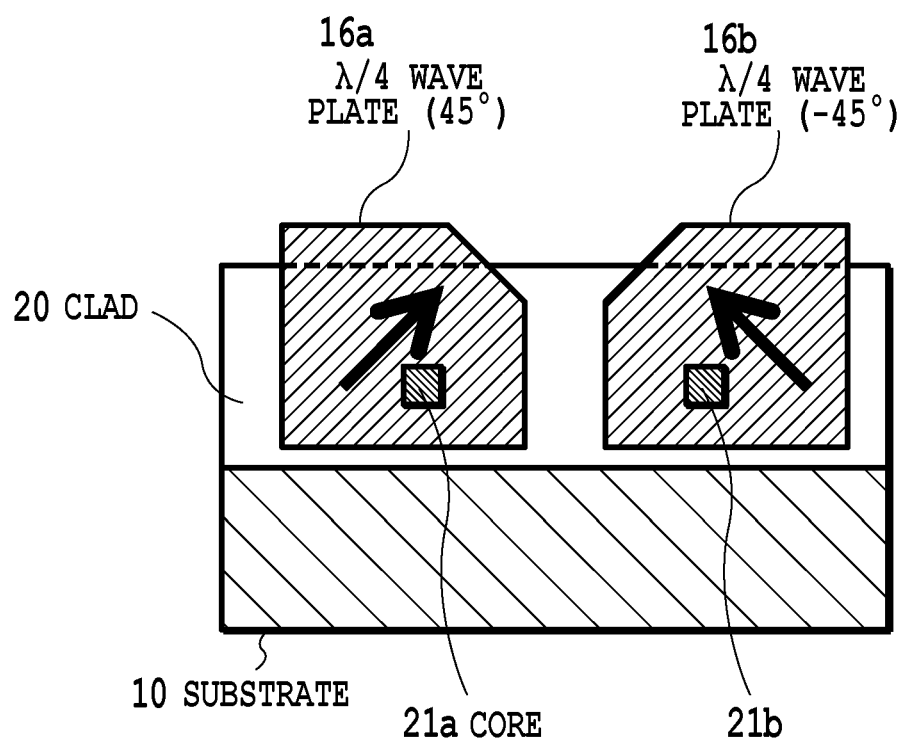
FIG. 10 is a cross-sectional view taken along the X-X line of FIG. 9.

FIG. 10 shows a cross-sectional view taken along the X-X line of FIG. 9. The two arms 13a, 13b are formed on a substrate 10 and the quarter wave plates 16a, 16b are provided to extend across cores of the respective arms 13a, 13b.

Figure 11:
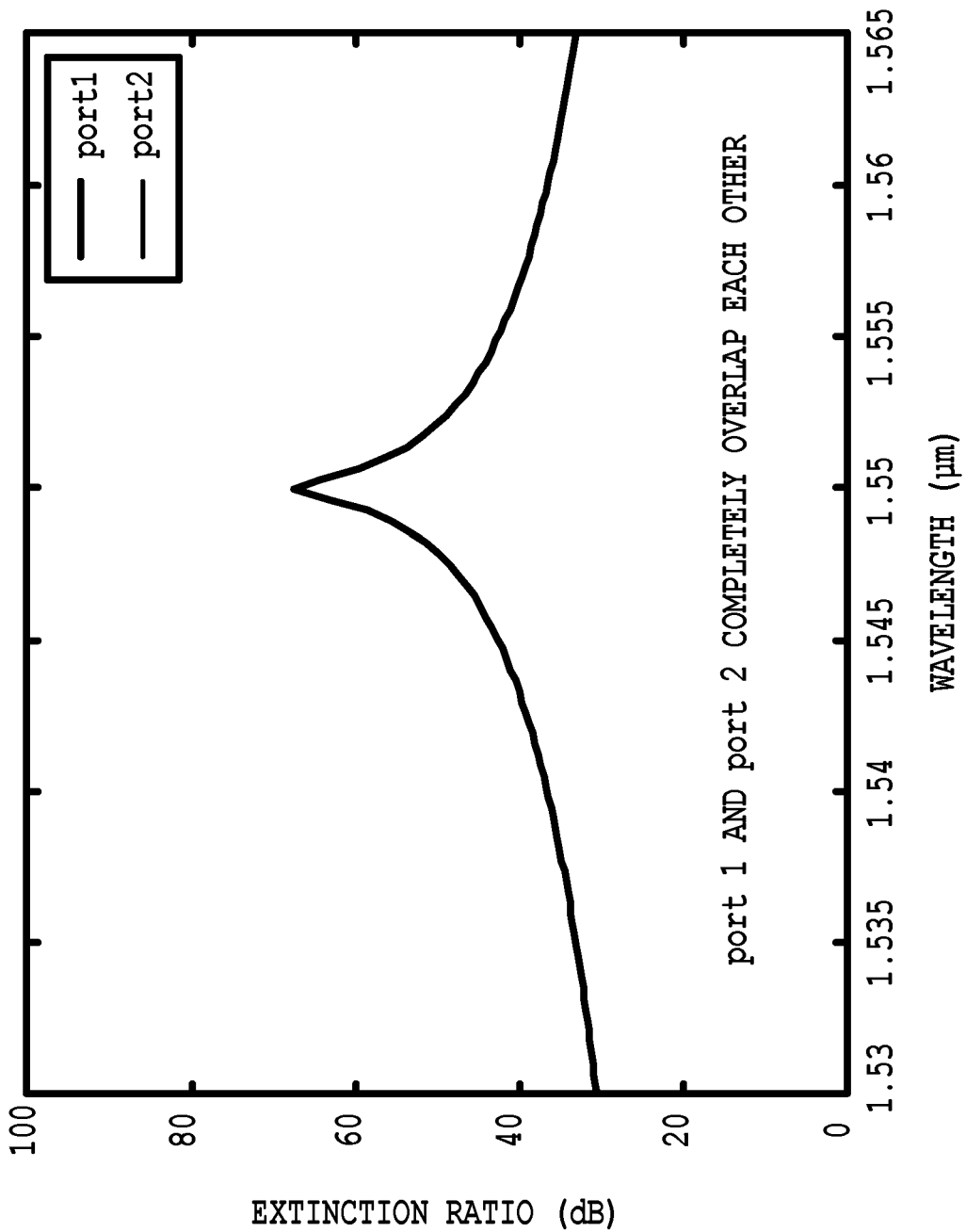
FIG. 11 is a view showing wavelength dependence of a polarization extinction ratio of the waveguide-type polarization beam splitter in the second embodiment.

In contrast to the example shown in FIG. 2, in the waveguide-type polarization beam splitter of the embodiment, the wavelength dependence of the polarization extinction ratio is drastically reduced as shown in FIG. 11.

Figure 12:
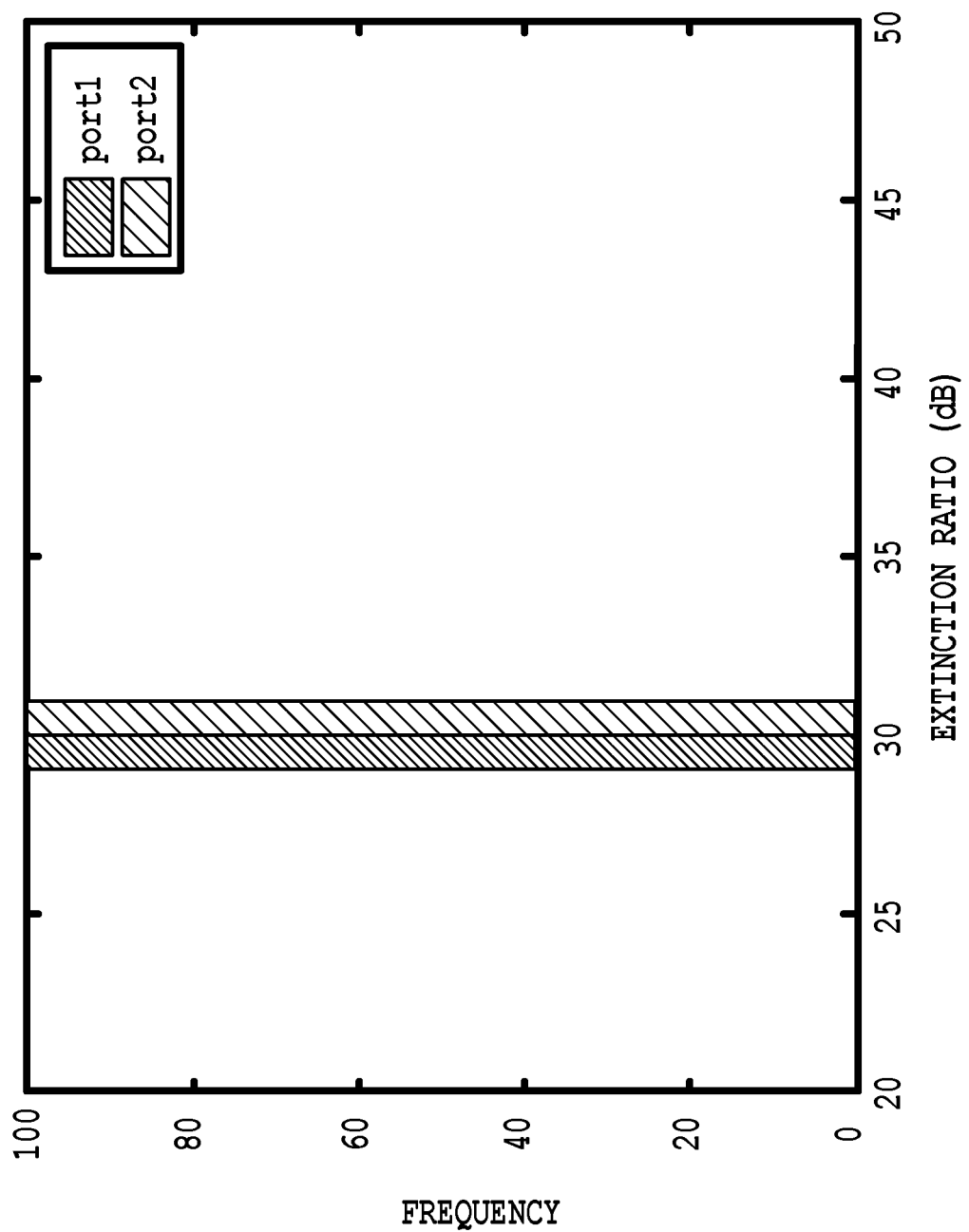
FIG. 12 is a histogram showing the polarization extinction ratio of the waveguide-type polarization beam splitter in the second embodiment.

Moreover, in contrast to the example shown in FIG. 3, in the waveguide-type polarization beam splitter of the embodiment, the polarization extinction ratio of 25 dB or more is secured as shown in FIG. 12 in a case where the manufacturing tolerance is considered.

REFERENCE SIGNS LIST 101, 11 Input optical waveguide
102, 12 First optical coupler
103, 13 Pair of optical waveguide arms
104, 15 waveguide groove
14, 17 Tapered optical waveguide or parabolic optical waveguide
105, 16 Quarter wave plate
106, 18 Second optical coupler
107, 19 Output optical waveguide
20 Clad
21 Core
22 Delay

The invention claimed is:

1. A waveguide-type polarization beam splitter formed on a substrate, the waveguide-type polarization beam splitter comprising:
 one or two input optical waveguides;
 a first optical coupler optically coupled to the one or two input optical waveguides and having one input and two outputs or two inputs and two outputs;
 a second optical coupler having two inputs and one output or two inputs and two outputs; and
 a pair of optical waveguide arms each optically coupled to a corresponding one of the outputs of the first optical coupler and to a corresponding one of the inputs of the second optical coupler such that each of the optical waveguide arms extends between the first and second optical couplers,
 wherein
 a groove is provided to extend across the pair of optical waveguide arms, two quarter wave plates are inserted in the groove to extend respectively across the pair of optical waveguide arms, and polarization axes of the respective two quarter wave plates are orthogonal to each other,
 one of the first optical coupler and the second optical coupler is an optical coupler which gives a phase shift of about 90° or about −90° between coupled or split light beams, and another one of the first optical coupler and the second optical coupler is an optical coupler which gives a phase shift of about 0° or about 180° between coupled or split light beams, and
 each of the optical waveguide arms has a length measured from the first optical coupler to the second optical coupler, the length of each of the optical waveguide arms being equal so as to reduce wavelength dependence of the waveguide-type polarization beam splitter.

2. The waveguide-type polarization beam splitter according to claim 1, wherein the optical coupler which gives the phase shift of about 0° or about 180° between coupled or split light beams is any one of a Y-branch coupler, a multimode interference optical coupler having one input and two outputs, a multimode interference optical coupler having two inputs and one output, and an X-branch coupler.

3. The waveguide-type polarization beam splitter according to claim 1, wherein the optical coupler which gives the phase shift of about 90° or about −90° between coupled or split light beams is a multimode interference optical coupler having two inputs and two outputs or a directional coupler.

4. The waveguide-type polarization beam splitter according to claim 1, wherein the angles of the polarization axes of the two quarter wave plates respectively form angles of 0° and 90° with respect to a substrate plane of the waveguides.

5. The waveguide-type polarization beam splitter according to claim 1, wherein each of the two quarter wave plates is a polyimide wave plate.

6. The waveguide-type polarization beam splitter according to claim 1, wherein the waveguide-type polarization beam splitter further comprises tapered portions before and after the groove.

7. The waveguide-type polarization beam splitter according to claim 1, wherein the waveguide-type polarization beam splitter further comprises waveguide lenses before and after the groove.

8. The waveguide-type polarization beam splitter according to claim 1, wherein each of the optical waveguides is a quartz-based optical waveguide formed on a silicon substrate.

9. A waveguide-type polarization beam splitter formed on a substrate, the waveguide-type polarization beam splitter comprising:
an input optical waveguide;
a first optical coupler having an input and first and second outputs, the input optical waveguide being optically coupled to the input of the first optical coupler;
a second optical coupler having first and second inputs and one or two outputs, one of the first and second optical couplers being configured to give a phase shift of about 90° or about −90° between coupled or split light beams, and the other of the first and second optical couplers being configured to give a phase shift of about 0° or about 180° between coupled or split light beams;
first and second optical waveguide arms extending respectively from the first and second outputs of the first optical coupler to the first and second inputs of the second optical coupler, the first and second optical waveguide arms each having a length measured from the first optical coupler to the second optical coupler, the lengths of the first and second optical waveguide arms being equal so as to reduce wavelength dependence of the waveguide-type polarization beam splitter; and
first and second quarter wave plates extending respectively across the first and second optical waveguide arms, the first and second quarter wave plated being positioned in a groove extending across the first and second optical waveguide arms, the first and second quarter wave plates having polarization axes orthogonal to each other.

10. A waveguide-type polarization beam splitter formed on a substrate, the waveguide-type polarization beam splitter comprising:
first and second input optical waveguides;
a first optical coupler having first and second inputs and first and second outputs, the first and second input optical waveguides being optically coupled respectively to the first and second inputs of the first optical coupler;
a second optical coupler having first and second inputs and one or two outputs, one of the first and second optical couplers being configured to give a phase shift of about 90° or about −90° between coupled or split light beams, and the other of the first and second optical couplers being configured to give a phase shift of about 0° or about 180° between coupler of split light beams;
first and second optical waveguide arms extending respectively from the first and second outputs of the first optical coupler to the first and second inputs of the second optical coupler, the first and second optical waveguide arms each having a length measured from the first optical coupler to the second optical coupler, the lengths of the first and second optical waveguide arms being equal so as to reduce wavelength dependence of the waveguide-type polarization beam splitter; and
first and second quarter wave plates extending respectively across the first and second optical waveguide arms, the first and second quarter wave plates being positioned in groove extending across the first and second optical waveguide arms, the first and second quarter wave plates having polarization axes orthogonal to each other.

* * * * *